Figure 1:
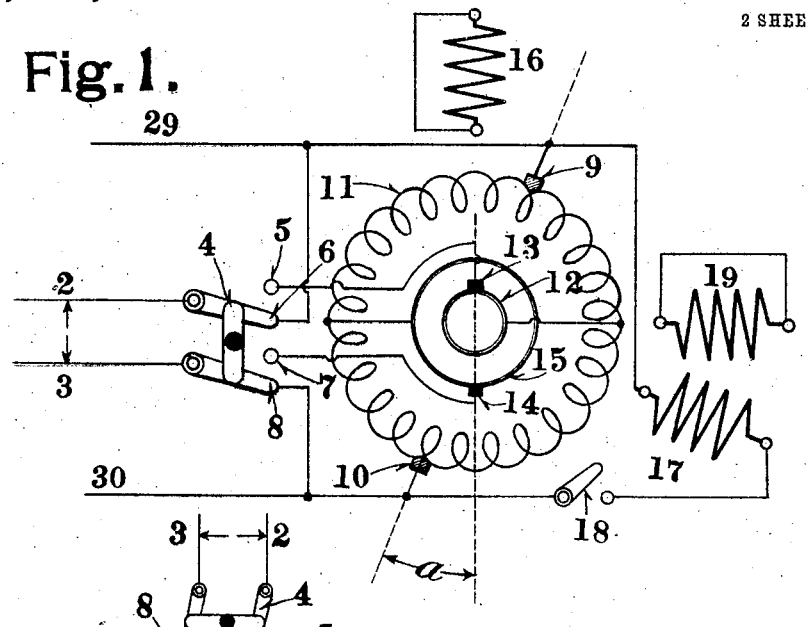

S. SPARROW.
DYNAMO ELECTRIC MACHINE.
APPLICATION FILED JUNE 15, 1912.

1,104,715.

Patented July 21, 1914.
2 SHEETS—SHEET 1.

WITNESSES:
Chas. A. Becker,
W. A. Alexander.

INVENTOR:
Simon Sparrow
BY
E. E. Huffman
ATTORNEY

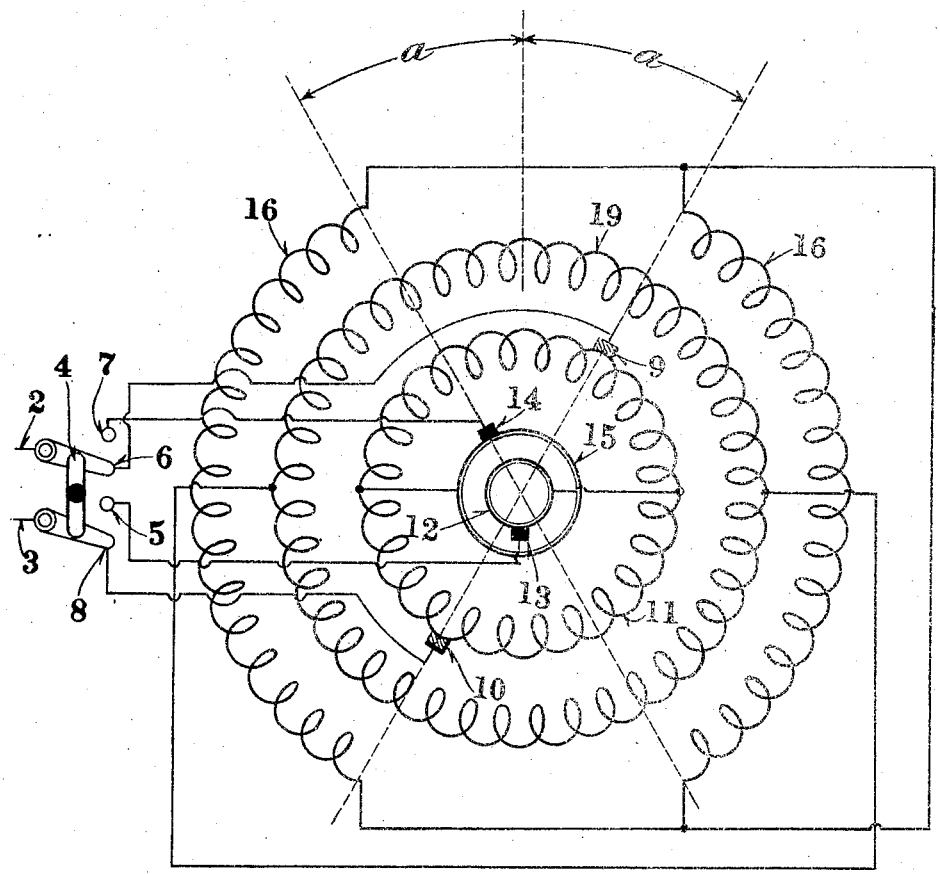

UNITED STATES PATENT OFFICE.

SIMON SPARROW, OF ST. LOUIS, MISSOURI, ASSIGNOR TO WAGNER ELECTRIC MANUFACTURING COMPANY, OF ST. LOUIS, MISSOURI, A CORPORATION OF MISSOURI.

DYNAMO-ELECTRIC MACHINE.

1,104,715.

Specification of Letters Patent. Patented July 21, 1914.

Application filed June 15, 1912. Serial No. 703,785.

*To all whom it may concern:*

Be it known that I, SIMON SPARROW, a citizen of the United States of America, residing at the city of St. Louis, State of Missouri, have invented a certain new and useful Dynamo-Electric Machine, of which the following is such a full, clear, and exact description as will enable any one skilled in the art to which it appertains to make and use the same, reference being had to the accompanying drawings, forming part of this specification.

My invention relates to dynamo electric machines and particularly to means for starting, or for starting and operating single-phase motors.

My invention is applicable to motors having a stator closed along a plurality of axes and a rotor provided with a commuted winding and brushes coöperating therewith. I have discovered that I can cause a machine of this description to start from rest with a powerful torque by displacing the brushes coacting with the commuted winding by a small angle from one of the axes along which the stationary member is short-circuited and by connecting said brushes to the supply. If the brushes occupy a position coincident with the one of the axes along which the stationary member is closed, or short-circuited, then no torque will be developed, nor will a torque be developed if said brushes occupy a position half way between the axes along which the stationary member is closed, provided the time constants of the various stator circuits are the same and provided they all stand in the same inductive relation to the rotor. In order to secure a starting torque, I displace the commutator brushes by a small angle from one of the axes along which the stator is closed and connect said brushes to the source of alternating current. To improve this starting torque, I give the closed, or short-circuited stator windings different space distributions. In this manner, I can start motors possessing the elements in question without interrupting the stator short-circuits. This, in some cases, is a very material advantage. I can, operate such machines in their starting connection, but I generally prefer to convert them into induction motors having a shunt characteristic after a sufficient speed has been reached. I can do this by connecting the commuted winding to slip-rings as well as to a commutator, disconnecting the mains from the commutator and connecting them to said slip rings after a sufficient speed has been reached.

I will describe my invention more particularly with reference to a single-phase converter and will show how it can be applied for the purpose of starting such a machine from the alternating current side.

Figure 2:
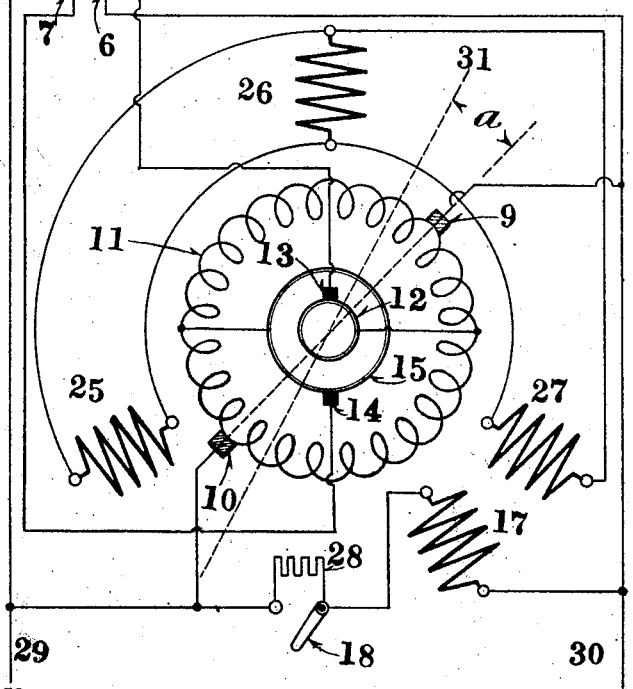

In the accompanying drawings, Figure 1 shows a single-phase 2-pole converter provided with stator windings along axes displaced by 90 electrical degrees. Fig. 2 illustrates a similar 2-pole machine, the stator of which is provided with windings closed along three axes displaced by 120 electrical degrees, and Fig. 3 shows the preferred relative space distribution of the stator windings for a 2-pole motor having stator windings displaced by 90 electrical degrees, that is by $180/n$ degrees where $n$ stands for the number of poles of the motor.

Referring to Fig. 1, the stator carries two permanently closed windings 16, 19, displaced by $180/n$ degrees, and an exciting winding 17 adapted to be connected to the brushes 9, 10, by way of the switch 18. The rotor carries a commuted winding 11 with which the brushes 9, 10, coöperate. These brushes are displaced by a small angle $a$ with respect to the short-circuited stator winding 16. The commuted winding 11 is also connected to the sliprings 12, 15 on which rest the brushes 13, 14 connected to the terminals 5, 7 of the machine. The terminals 6, 8 thereof are connected to the brushes 9, 10 resting on the commuted winding. A double throw 2-pole switch 4 is adapted to connect the alternating current main 2, 3, either to the commutator brushes or to the slip-rings.

The mode of operation of this machine is as follows: At starting the switch 18 may be left open and the mains 2, 3 are connected to the commutator brushes 9, 10 as shown in the figure. Under these conditions, the machine will develop a powerful torque. After it has reached a sufficient speed, switch 4 can be moved to points 5 and 7. The machine will now operate as an ordinary single-phase asynchronous motor and if it is desired to convert same into a single-phase converter delivering direct current to the leads 29, 30, then it is only necessary to close switch 18, thus connecting winding 17 to the commutator brushes 9, 10 and producing at right angles to said brushes, a definite unidirectional magnetization.

The reason why the machine will start when the brushes 9, 10 are connected to an alternating current supply, provided these brushes be slightly displaced from one of the short-circuited stator windings, such as 16, by the small angle $a$, may be explained as follows: The alternating current sent into the brushes 9, 10 produces a certain number of ampere turns directed along the axis of the brushes 9, 10 and can be decomposed into two components at right angles to each other. The component coinciding in direction with the axis of the stator winding 16 is proportioned to $180-2a$ degrees. The component at right angles to it and, therefore, coinciding in direction with the axis of the stator winding 19 is proportioned to $2a$ degrees. Assume that each of the stator windings 16, 19 is distributed over one half of the stator bore, as is usual. Noting that the rotor ampere turns magnetizing along the axis of the winding 16, are distributed over a large portion of the rotor circumference, it will be seen that they must be in good inductive relation with the winding 16. Said winding having a low ohmic resistance and being short-circuited, the flux of mutual induction between rotor and stator along the axis of 16, will be small. In the horizontal axis, the rotor ampere turns are distributed over a small portion of the rotor circumference and are, therefore, in a less thorough inductive relation with the low resistance short-circuited stator winding 19. This condition will result in a somewhat larger flux of mutual induction between the rotor and stator along the horizontal than along the vertical axis. These two fluxes and the two belts of ampere turns on the rotor produce two torques in the motor and said torques oppose each other. If the rotor belts were equal in extent and the fluxes were equal in magnitude, then the resultant torque would be zero. As it is, the horizontal rotor belt, proportional to $2a$, is of small extent and coöperates with the small vertical flux of mutual induction whereas the vertical rotor belt, proportional to $180-2a$, is of much greater extent and coöperates with the larger flux of mutual induction which is present in the horizontal axis. This consideration will show that the arrangement described will cause the machine to start, even if both stator windings 16 and 19 are absolutely short-circuited and have the same space distribution. The useful torque will be equal to the difference of the two component torques just discussed.

In my preferred form of dynamo electric machine, I increase the useful torque by increasing the positive and decreasing the negative component thereof. This I achieve by giving the stator winding 16 a space distribution coinciding as nearly as possible with the angle $180-2a$ and by distributing the stator winding 19 over the whole stator bore as illustrated in Fig. 3. Under these conditions, the mutual induction between the vertical rotor ampere turns and the winding 16 will be the best possible while that between the horizontal rotor ampere turns and the stator winding 19 will be very poor. The vertical flux of mutual induction which coöperates with the few horizontal ampere turns will be small while the horizontal flux of mutual induction coöperating with the many vertical rotor ampere turns will be much larger. Since the first two are responsible for the negative and the last two for the positive torque components, it is clear that the resultant or useful torque will be increased.

Fig. 2 differs from Fig. 1 in that a high ohmic resistance 28 is arranged to bridge the contacts of the switch 18 so that the circuit of the exciting winding 17 is never interrupted and in that the stator carries a short-circuited three-phase winding 25, 26, 27, instead of the short-circuited two-phase winding 16, 19. The brushes 9, 10 are here displaced by a small angle $a$ from the resultant axis of magnetization 31 of the two windings 25 and 26, and the operation of the machine is exactly similar to that of Fig. 1. The two stator windings 25, 26 may be considered as taking the place of the winding 16 of Fig. 1 and the winding 27 of Fig. 2 as taking the place of winding 19 of Fig. 1. Fig. 3 shows the preferred distribution of the short-circuited stator windings in case two such windings only are used and are displaced by 90 electrical degrees. This figure shows a 2-pole motor and is otherwise quite similar to Fig. 1. At starting, switch 4 stands on points 6, 8 connecting the alternating current mains 2, 3 to the commutator brushes 9, 10. If it is desired to convert the machine into an ordinary induction motor with shunt characteristic after the machine has reached a sufficient speed, it is only necessary to throw switch 4 on to points 5 and 7.

Having fully described my invention, what I claim as new and desire to secure by Letters Patent of the United States is:

1. In a dynamo electric machine, the combination with a stator provided with at least two permanently closed circuits per pole pair disposed along different axes, of a rotor having a commuted winding and brushes displaced from the axis of each of the stator closed circuits, and means for supplying alternating current to the brushes.

2. In a dynamo electric machine, the combination with a stator provided with at least two short-circuited distributed windings per pole pair having different axes, one of said windings being distributed over a smaller portion of the stator than the other, of a rotor having a commuted winding and brushes displaced from each axis along which the stator is short-circuited, and means for supplying alternating current to the brushes.

3. In a dynamo electric machine, the combination with a stator provided with at least two short-circuited windings per pole pair positioned along different axes, of a rotor having a commuted winding and sliprings connected thereto, brushes on the commuted winding displaced from each axis along which the stator is short-circuited, and means for supplying alternating current to the brushes or to the sliprings at will.

4. In a dynamo electric machine, the combination with a stator provided with at least two short-circuited distributed windings per pole pair having different axes, one of said windings being distributed over a smaller portion of the stator than the other, of a rotor having a commuted winding and sliprings connected thereto, brushes on the commuted winding displaced from each axis along which the stator is short-circuited, and means for supplying alternating current to the brushes or to the sliprings at will.

5. In a dynamo electric machine, the combination with a source of alternating current, of a stator having one short-circuited winding distributed over 180–2$a$ electrical degrees and another short-circuited winding displaced from the first and having a different space distribution, a rotor having a commuted winding, and brushes connected to the supply and displaced by $a$ degrees from the first stator winding.

In testimony whereof, I have hereunto set my hand and affixed my seal in the presence of the two subscribing witnesses.

SIMON SPARROW. [L. S.]

Witnesses:
VAL A. FYNN,
EMILY W. HEUERMAN.